(12) United States Patent
Matz et al.

(10) Patent No.: US 12,428,203 B2
(45) Date of Patent: Sep. 30, 2025

(54) INSTRUMENT CLOSURE INCLUDING SENSOR RETAINER

(71) Applicant: AGILENT TECHNOLOGIES, INC., Santa Clara, CA (US)

(72) Inventors: Patrick Matz, Host (DE); Matthias Kamuf, Waldbronn (DE); Manuel Van Venrooy, Waldbronn (DE); István Molnar, Host (DE); Tobias Anhaus, Host (DE)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 108 days.

(21) Appl. No.: 18/072,461

(22) Filed: Nov. 30, 2022

(65) Prior Publication Data

US 2023/0192364 A1 Jun. 22, 2023

Related U.S. Application Data

(60) Provisional application No. 63/291,812, filed on Dec. 20, 2021.

(51) Int. Cl.
*B65D 43/02* (2006.01)

(52) U.S. Cl.
CPC ...... *B65D 43/0231* (2013.01); *B65D 2555/00* (2013.01)

(58) Field of Classification Search
CPC ............. G01F 23/2961; G01F 23/2962; G01F 23/2963; G01F 23/2965; G01F 23/2966; G01F 23/2967; G01F 23/2968; B60K 2015/03217; F17D 3/01
See application file for complete search history.

(56) References Cited

U.S. PATENT DOCUMENTS

| | | |
|---|---|---|
| 2,653,478 A | 9/1953 | Harper |
| 2,960,678 A | 11/1960 | Beard et al. |
| 4,668,393 A * | 5/1987 | Stone ............ B01D 21/10 210/493.4 |
| 4,690,670 A * | 9/1987 | Nielsen ............ B04B 5/0414 215/276 |
| 5,950,487 A | 9/1999 | Maresca, Jr. et al. |
| 7,121,140 B2 | 10/2006 | Lo |
| 8,091,579 B2 | 1/2012 | Sintes et al. |
| 8,677,923 B2 | 3/2014 | Goff |
| 9,121,745 B2 | 9/2015 | Beyer et al. |
| 9,416,526 B2 | 8/2016 | Goff |
| 9,417,113 B2 | 8/2016 | Jäger et al. |

(Continued)

FOREIGN PATENT DOCUMENTS

| | | |
|---|---|---|
| CN | 211042420 U | 7/2020 |
| DE | 102018214707 A1 | 3/2020 |
| EP | 0972482 A1 | 1/2000 |

OTHER PUBLICATIONS

Notice of Allowance for U.S. Appl. No. 29/875,943, mailed Mar. 28, 2024, 12 pages.

*Primary Examiner* — Andrew T Kirsch

(57) ABSTRACT

In some examples, an instrument closure may include an instrument closure retainer to retain the instrument closure onto a container. The instrument closure may further include a sensor retainer including a plurality of apertures for transfer or removal of material, respectively, into or from the container. The sensor retainer may further include a sensor mount to retain a sensor.

20 Claims, 15 Drawing Sheets

(56) References Cited

U.S. PATENT DOCUMENTS

| | | |
|---|---|---|
| 9,759,596 B2 | 9/2017 | Pettigrew |
| 10,324,075 B2 * | 6/2019 | Gurumohan ............ G01F 22/00 |
| 10,583,227 B2 | 3/2020 | Schmidt |
| 10,647,484 B2 | 5/2020 | Bentkovski |
| 10,683,197 B1 | 6/2020 | Paben |
| D991,059 S | 7/2023 | Schätzle et al. |
| 11,860,001 B2 | 1/2024 | Hänel et al. |
| 11,878,843 B2 | 1/2024 | Wang |
| 2005/0284217 A1 * | 12/2005 | Miyagawa .......... G01F 23/2962 |
| | | 73/290 V |
| 2007/0289375 A1 | 12/2007 | Helstern et al. |
| 2010/0163567 A1 * | 7/2010 | Chiang ................ G01F 23/686 |
| | | 99/275 |
| 2012/0006251 A1 | 1/2012 | Kiefer |
| 2014/0026990 A1 * | 1/2014 | Delihas .................... F17D 3/01 |
| | | 137/558 |
| 2015/0210430 A1 * | 7/2015 | Naito ..................... B65D 85/70 |
| | | 206/524.3 |
| 2016/0025545 A1 * | 1/2016 | Saltzgiver ............ B65D 51/245 |
| | | 73/304 C |

\* cited by examiner

SECTION D-D

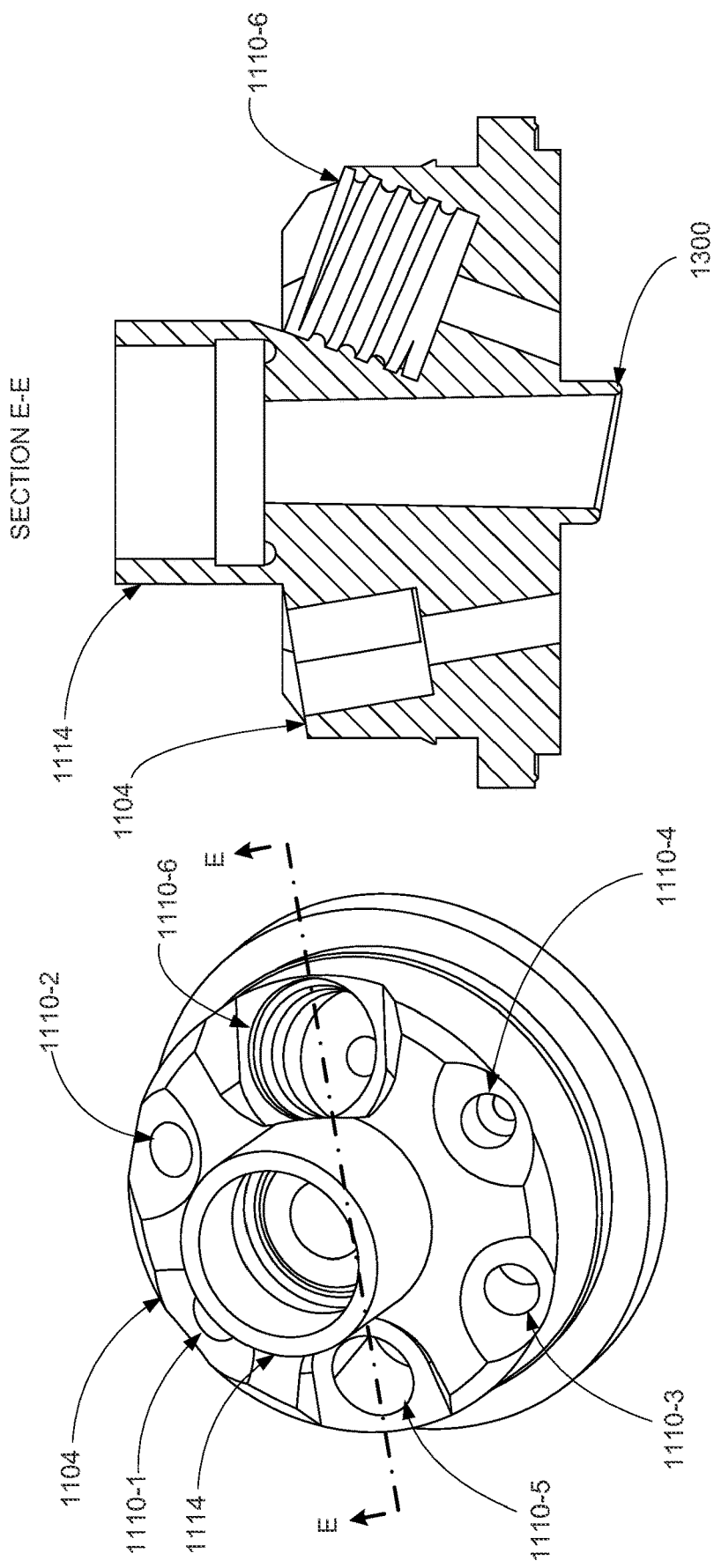

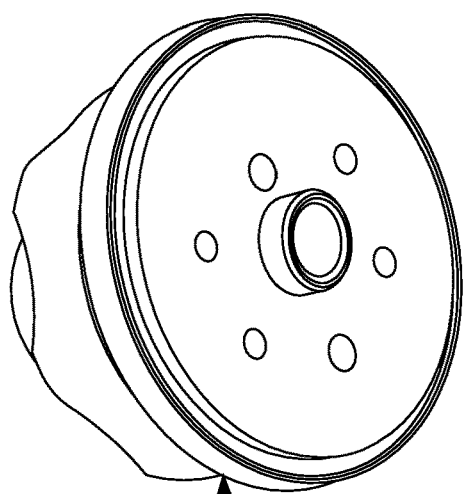
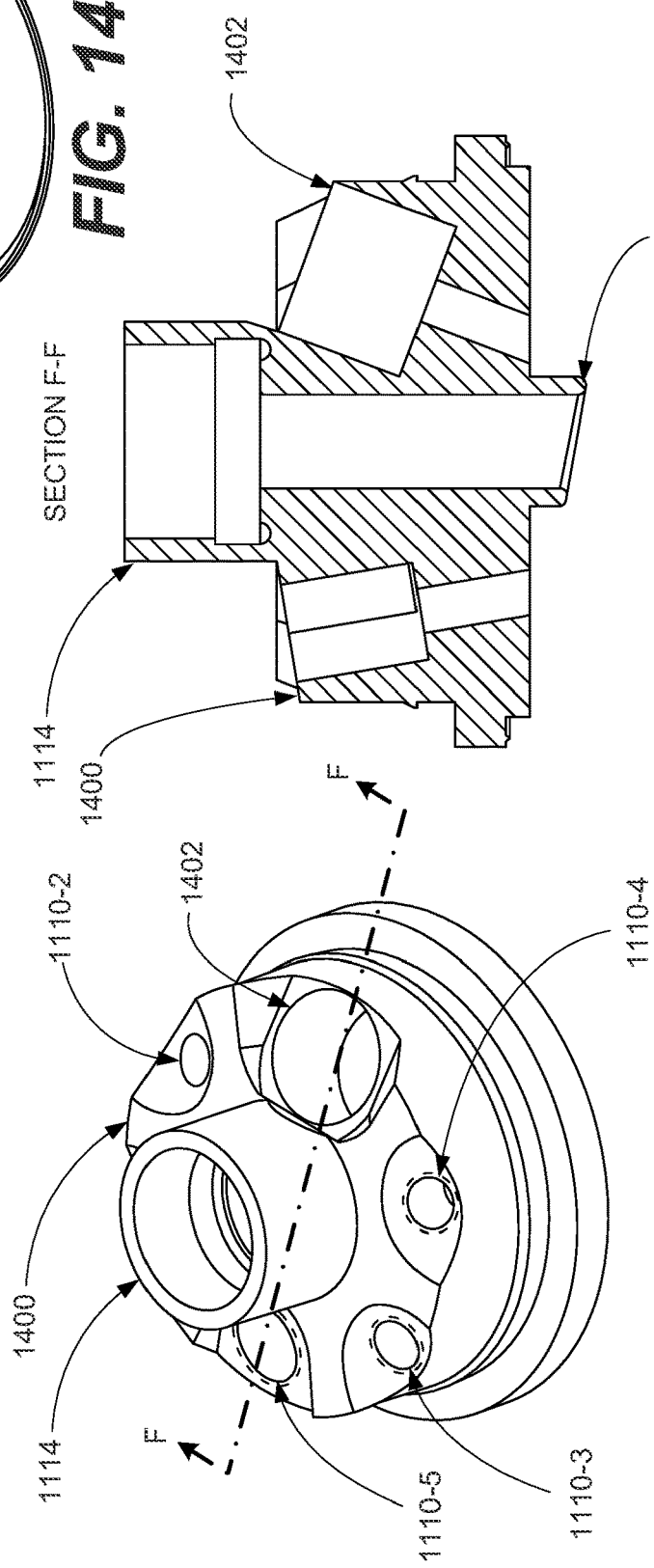

INSTRUMENT CLOSURE INCLUDING SENSOR RETAINER

PRIORITY

This application claims priority to commonly assigned and Provisional Application Ser. No. 63/291,812, filed Dec. 20, 2021, titled "INSTRUMENT CLOSURE INCLUDING SENSOR RETAINER", the disclosure of which is hereby incorporated by reference in its entirety.

BACKGROUND

With respect to content measurement, such as fluid measurement in a container, various techniques may be used to measure the content of the container. The measured content may be used for various types of analysis that account for a measurement value associated with the content.

BRIEF DESCRIPTION OF DRAWINGS

Features of the present disclosure are illustrated by way of example and not limited in the following figure(s), in which like numerals indicate like elements, in which:

FIGS. 13A and 13B respectively illustrate an isometric top view and a sectional (section E-E) view of the sensor retainer of FIG. 11, in accordance with an example of the present disclosure;

FIGS. 14A, 14B, and 14C respectively illustrate an isometric top view, a sectional (section F-F) view, and an isometric bottom view of another example of the sensor retainer, in accordance with an example of the present disclosure.

DETAILED DESCRIPTION

Figure 1:
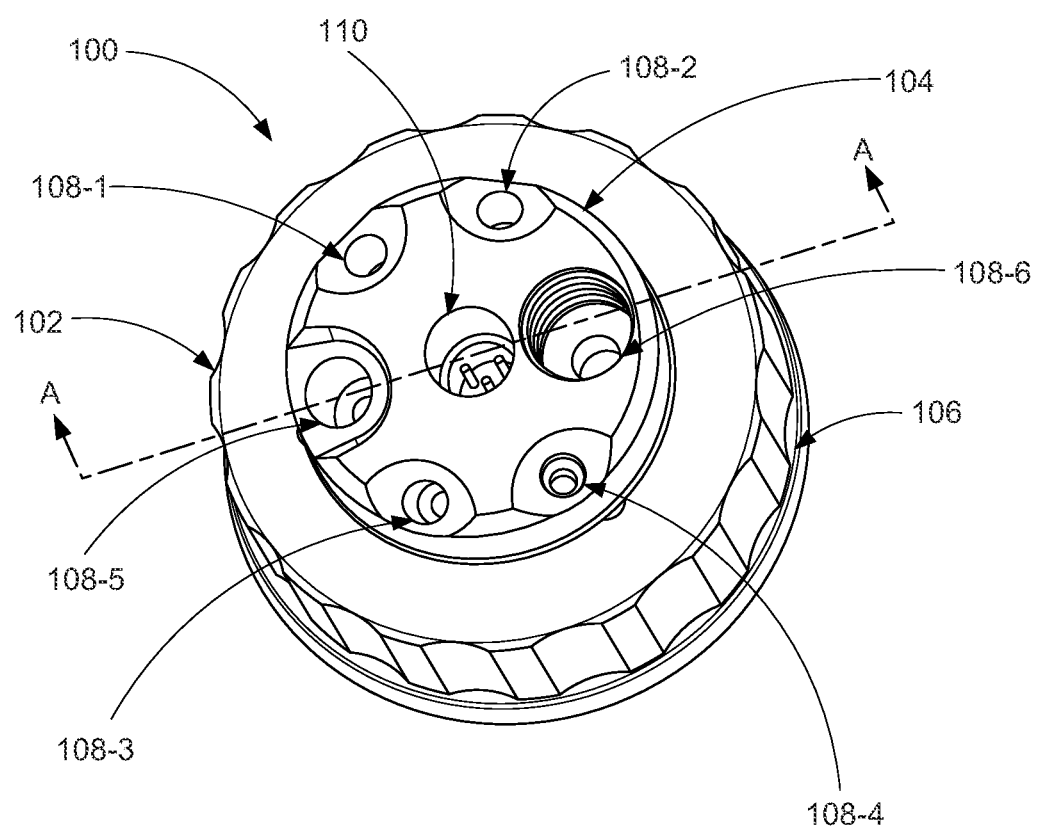
FIG. 1 illustrates an isometric view of an instrument closure including an instrument closure retainer and a sensor retainer, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to content measurement, such as fluid measurement in a container, a cap may be placed onto a container to seal the contents of the container for which the contents are to be measured. In this regard, it is technically challenging to accurately measure the contents of the container.

In order to address at least the aforementioned technical challenges, an instrument closure including an instrument closure retainer and a sensor retainer that retains a sensor, such as an ultrasonic sensor, may be used to accurately measure the contents of the container.

According to examples disclosed herein, the instrument closure may include an instrument closure retainer to retain the instrument closure onto a container. A sensor retainer may include a plurality of apertures for transfer or removal of material, respectively, into or from the container. The sensor retainer may further include a sensor mount to retain a sensor.

For the instrument closure described above, the sensor retainer may include a first face that is positioned towards the container and a second opposite face that is positioned away from the container when the instrument closure is retained onto the container. Further, the sensor mount may be positioned on the first face.

For the instrument closure described above, the sensor mount may include a cylindrical cross-section to retain a complementary shaped sensor substantially within the sensor mount.

For the instrument closure described above, the sensor mount may include at least two sensor mount structures that form a partial cylindrical cross-section to retain a cylindrical sensor substantially within the sensor mount.

For the instrument closure described above, the sensor mount may be positioned on the second face.

For the instrument closure described above, the sensor may include a floater that is at least partially disposed thorough the sensor retainer to measure a level of fluid in the container.

For the instrument closure described above, the sensor mount may be dimensioned to maintain the sensor at a predetermined distance from the container.

For the instrument closure described above, at least one aperture of the plurality of apertures may be internally threaded to retain an insert that is at least partially externally threaded.

For the instrument closure described above, the instrument closure retainer may include a knurled outer surface to facilitate gripping of the instrument closure retainer.

For the instrument closure described above, the sensor retainer may be at least partially retained within the instrument closure retainer.

For the instrument closure described above, at least one aperture of the plurality of apertures may be fluidically connected to a passage in the sensor retainer, and the passage may be transverse to a central axis of the instrument closure.

For the instrument closure described above, the sensor mount may be formed integrally with the sensor retainer. Alternatively, the sensor mount may be formed separately from the sensor retainer.

According to examples disclosed herein, an instrument closure may include an instrument closure retainer to retain the instrument closure onto a container. A sensor retainer may include a first face that is positioned towards the container and a second opposite face that is positioned away from the container when the instrument closure is retained onto the container. The sensor mount may be positioned on the first face, or the second face.

For the instrument closure described above, the sensor mount may be dimensioned to maintain a sensor at a predetermined distance from the container.

For the instrument closure described above, the sensor retainer may be at least partially retained within the instrument closure retainer.

According to examples disclosed herein, an instrument closure may include an instrument closure retainer to retain the instrument closure onto a container. The instrument closure may further include a sensor retainer that is at least partially retained within the instrument closure retainer. The sensor retainer may retain a sensor at a predetermined distance from the container when the instrument closure is retained onto the container.

The instrument closure described above may further include a tapered passage formed within the sensor retainer to transmit signals emitted from the sensor towards fluid in the container and receive the signals reflected by a fluid surface of the fluid in the container.

Figure 2:
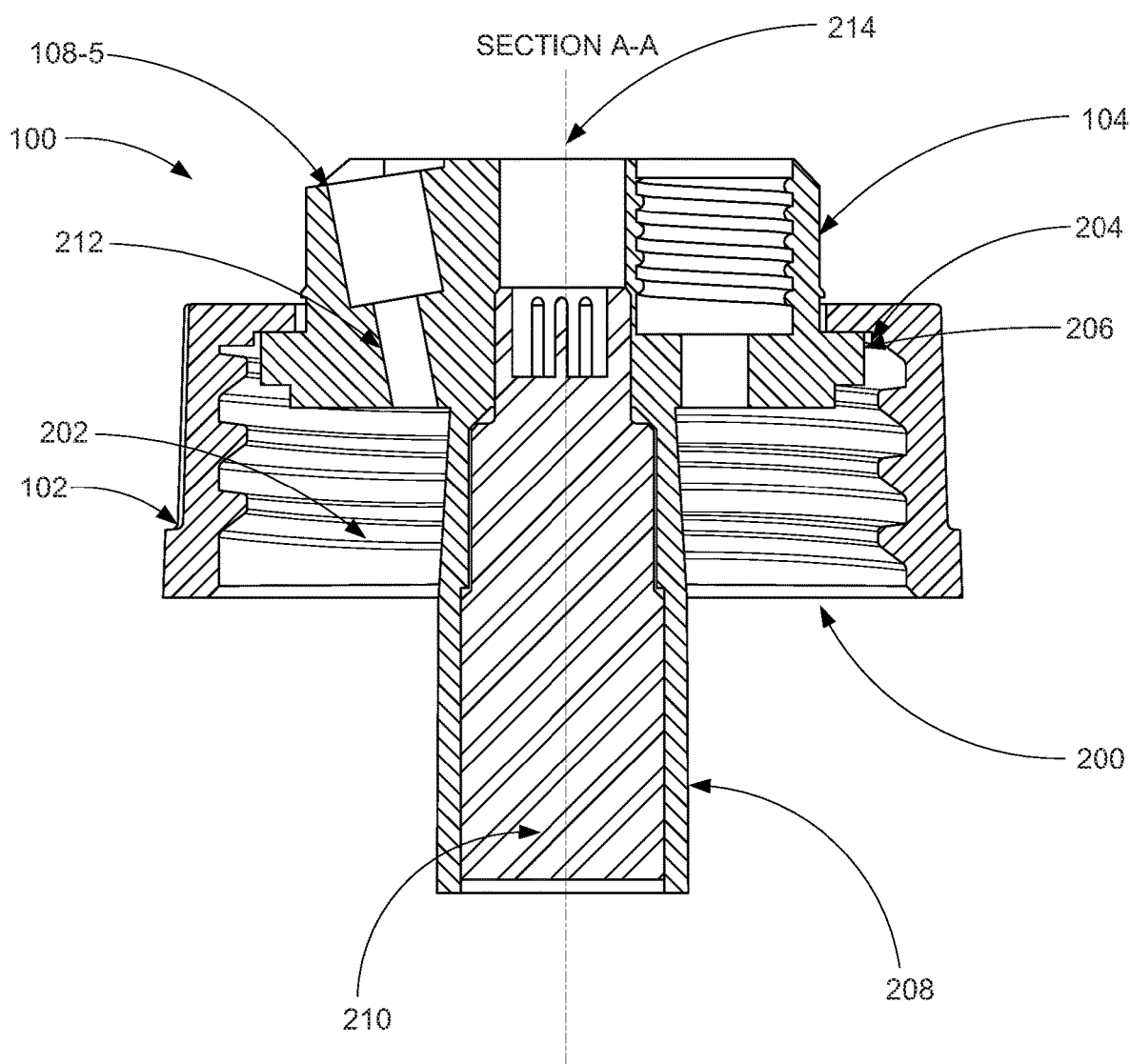
FIG. 2 illustrates a sectional view of the instrument closure of FIG. 1 taken generally along section A-A of FIG. 1, illustrating the instrument closure retainer, the sensor retainer, and a sensor retained in the sensor retainer, in accordance with an example of the present disclosure.
Figure 3:
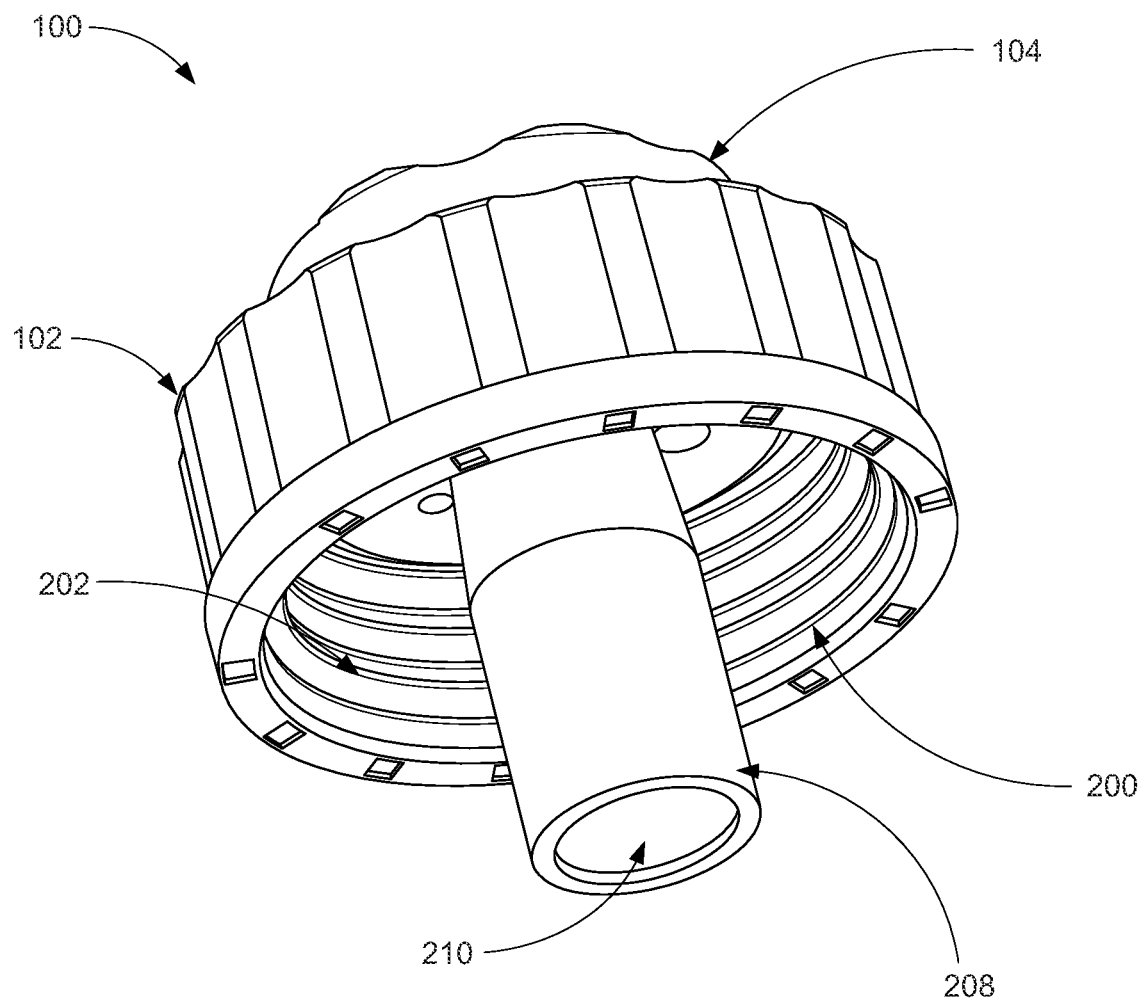
FIG. 3 illustrates another isometric view of the instrument closure of FIG. 1, illustrating the sensor retainer with the sensor retained therein, in accordance with an example of the present disclosure.

FIG. 1 illustrates an isometric view of an instrument closure 100 including an instrument closure retainer 102 and a sensor retainer 104, in accordance with an example of the present disclosure. FIG. 2 illustrates a sectional view of the instrument closure 100 taken generally along section A-A of FIG. 1, illustrating the instrument closure retainer 102, the sensor retainer 104, and a sensor 210 retained in the sensor retainer 104, in accordance with an example of the present disclosure. FIG. 3 illustrates another isometric view of the instrument closure 100, illustrating the sensor retainer 104 with the sensor 210 retained therein, in accordance with an example of the present disclosure.

Figure 4:
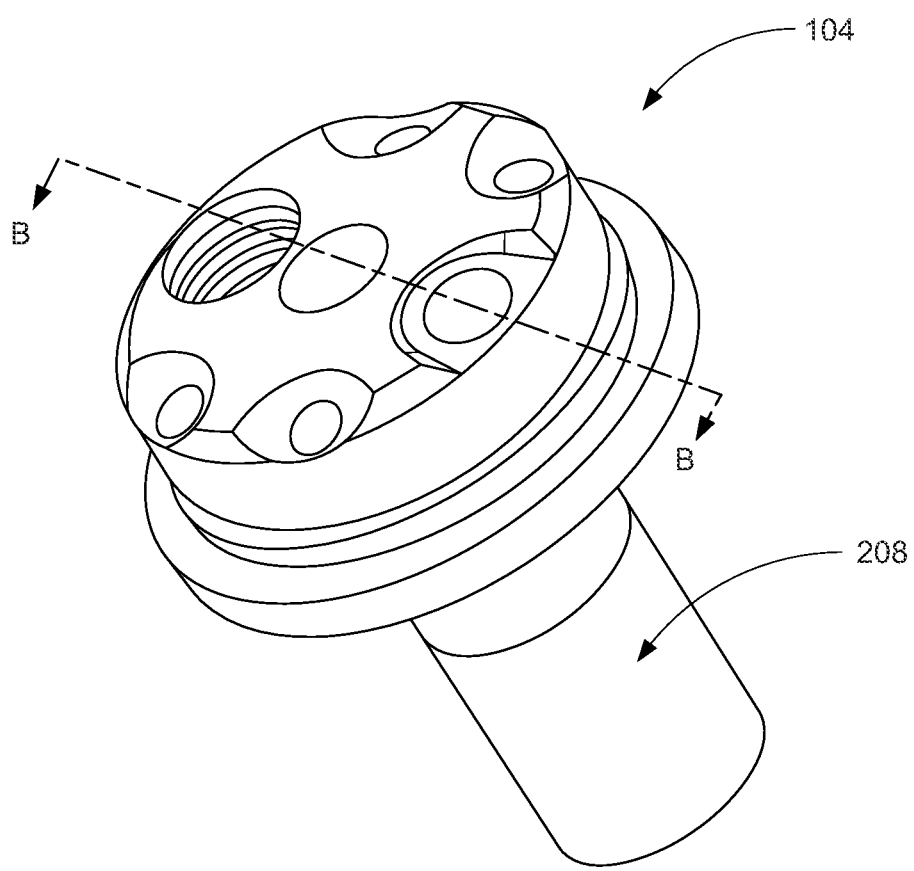
FIG. 4 illustrates an isometric view of the sensor retainer of FIG. 1, illustrating the sensor retainer without the sensor retained therein, in accordance with an example of the present disclosure.
Figure 5:
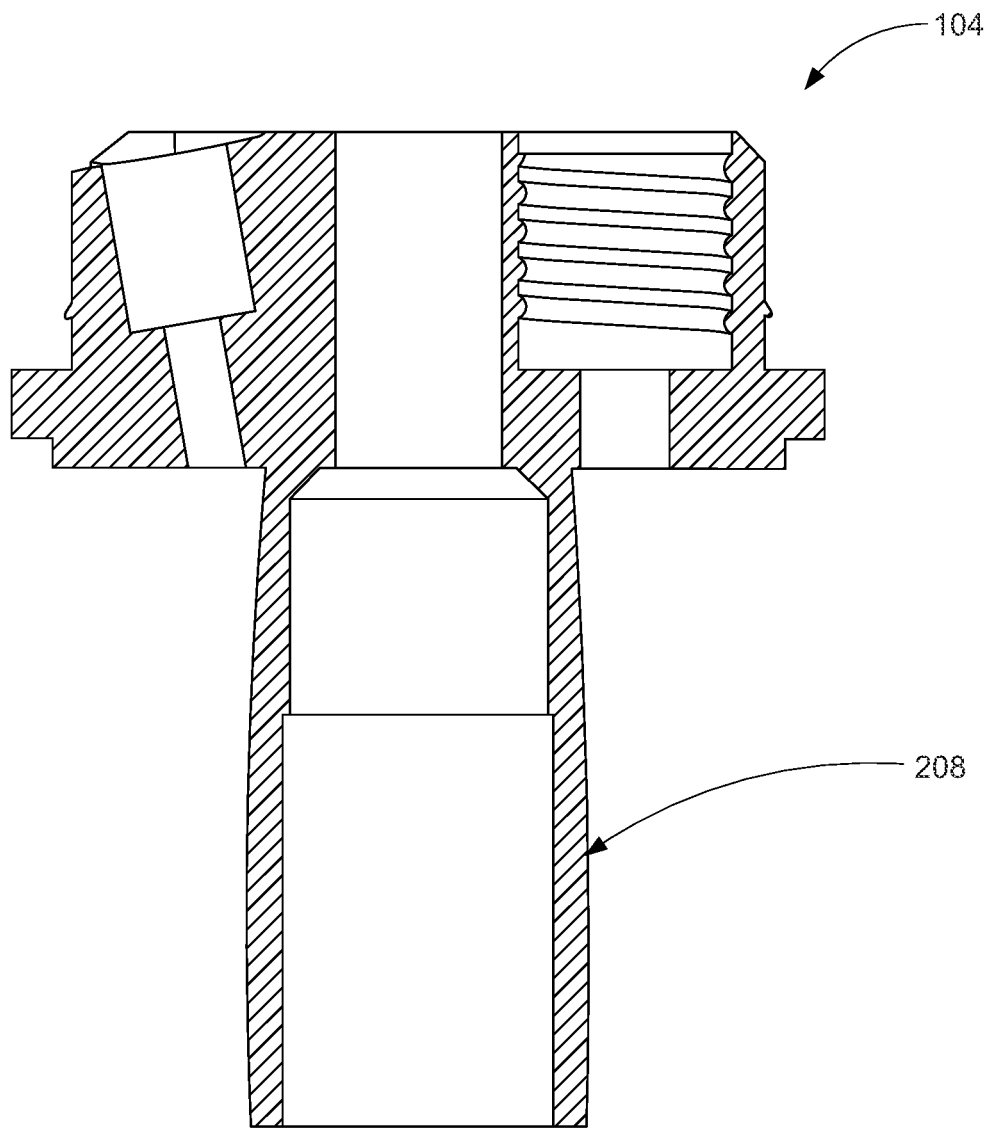
FIG. 5 illustrates a sectional view of the instrument closure of FIG. 1 taken generally along section B-B of FIG. 4, illustrating the sensor retainer in accordance with an example of the present disclosure.
Figure 6:
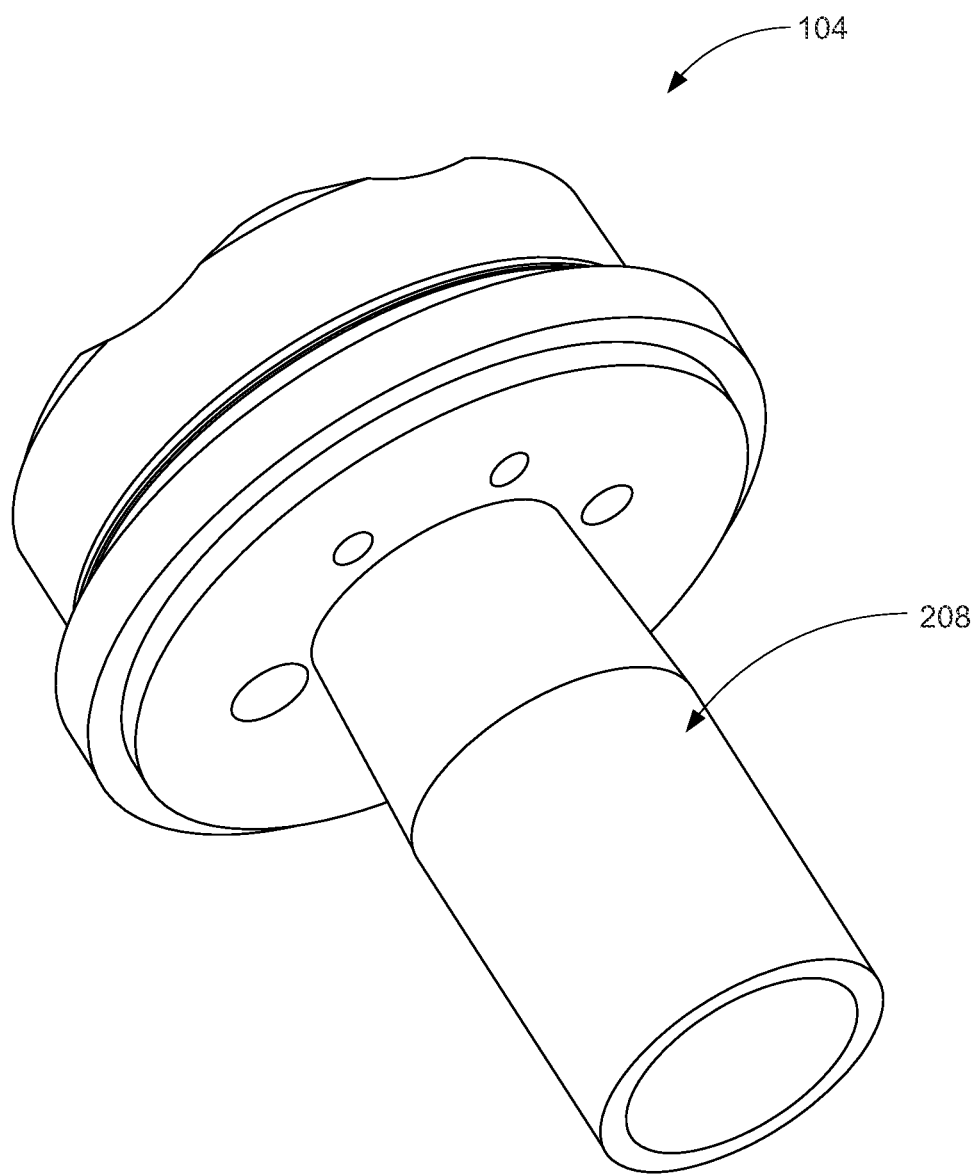
FIG. 6 illustrates another isometric view of the sensor retainer of FIG. 1, illustrating the sensor retainer without the sensor retained therein, in accordance with an example of the present disclosure.

FIG. 4 illustrates an isometric view of the sensor retainer 104, illustrating the sensor retainer 104 without the sensor 210 retained therein, in accordance with an example of the present disclosure. FIG. 5 illustrates a sectional view of the instrument closure 100 taken generally along section B-B of FIG. 4, illustrating the sensor retainer 104 in accordance with an example of the present disclosure. FIG. 6 illustrates another isometric view of the sensor retainer 104, illustrating the sensor retainer 104 without the sensor 210 retained therein, in accordance with an example of the present disclosure.

Referring to FIGS. 1-6, and particularly FIG. 1, the instrument closure 100 may include the instrument closure retainer 102 and the sensor retainer 104. The instrument closure retainer 102 may retain the instrument closure 100 onto a container (not shown), such as a bottle. The instrument closure retainer 102 may include an outer surface 106 including a knurled configuration to facilitate grasping and rotation of the instrument closure retainer 102. As shown in FIGS. 2 and 3, an inner surface 200 of the instrument closure retainer 102 may include threads 202 for threaded engagement with external threads (not shown) of the container (not shown). As shown in FIG. 2, the instrument closure retainer 102 may further include a notch 204 engageable with a surface of complementary protrusion 206 of the sensor retainer 104 to retain the sensor retainer 104 within the instrument closure retainer 102.

Referring again to FIG. 1, the sensor retainer 104 may include a plurality of apertures 108 (e.g., apertures 108-1, 108-2, 108-3, 108-4, 108-5, and 108-6 in the example of FIG. 1). Apertures 108-1, 108-2, 108-3, and 108-4 may be provided in a symmetric configuration for alignment with complementary inserts (not shown). Aperture 108-5 may be shaped similar to apertures 108-1, 108-2, 108-3, and 108-4, but include a larger diameter opening. Aperture 108-5 may be fluidically connected to passage 212 in the sensor retainer 104, and may be transverse to a central axis 214 of the instrument closure 100. Further, aperture 108-6 may include internal threads as shown for engagement with external threads of a complementary insert (not shown). The complementary inserts may provide for transfer or removal of fluid or other material, respectively, into or from the container (not shown) onto which the instrument closure 100 is connected.

The sensor retainer 104 may include a central aperture 110 for electrical connection to the sensor 210.

Referring to FIG. 2, the sensor retainer 104 may include a sensor mount 208 including a cylindrical configuration to removably retain the sensor 210. In the example of FIG. 2, the sensor 210 may include an ultrasonic sensor. The sensor 210 may be retained by a friction fit between an outer surface of the sensor 210 and an inner surface of the sensor mount 208. Alternatively, the sensor 210 may include an external threaded surface for complementary engagement with an internal threaded surface of the sensor mount 208.

Figure 7:
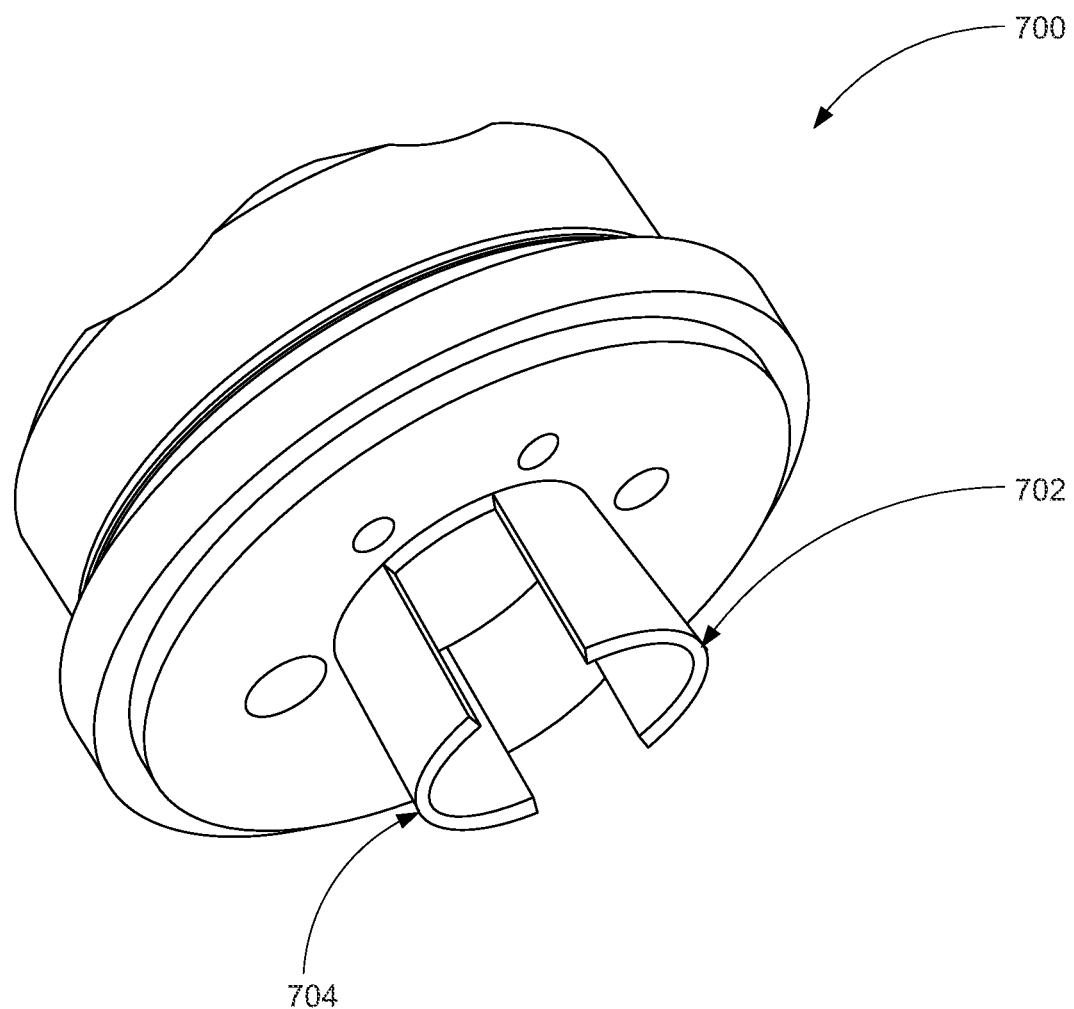
FIG. 7 illustrates an isometric view of another example of the sensor retainer of FIG. 1, illustrating the sensor retainer without the sensor retained therein, in accordance with an example of the present disclosure.

FIG. 7 illustrates an isometric view of another example of a sensor retainer 700, illustrating the sensor retainer 700 without the sensor retained therein, in accordance with an example of the present disclosure.

Referring to FIG. 7, compared to FIG. 2, the sensor retainer 700 may include a sensor mounts 702 and 704 (e.g., legs) to removably retain the sensor 210. The sensor 210 may be retained by a friction fit between an outer surface of the sensor 210 and inner surfaces of the sensor mounts 702 and 704. In this manner, various different configurations may be utilized for the sensor mounts 702 and 704 (e.g., two or more legs, resilient sensor mounts, etc.) to retain the sensor 210.

In an example, not shown in the figures, the sensor mount 208 is not positioned at the bottom of the sensor retainer 104, as shown in FIGS. 1-7. For example, the sensor mount 208 may be located on the top or side of the sensor retainer 104. Moreover, in an example the sensor retainer 104 and the sensor mount, such as sensor mount 208, may be two separate parts that are connected to one another or may be a single part.

Figure 8:
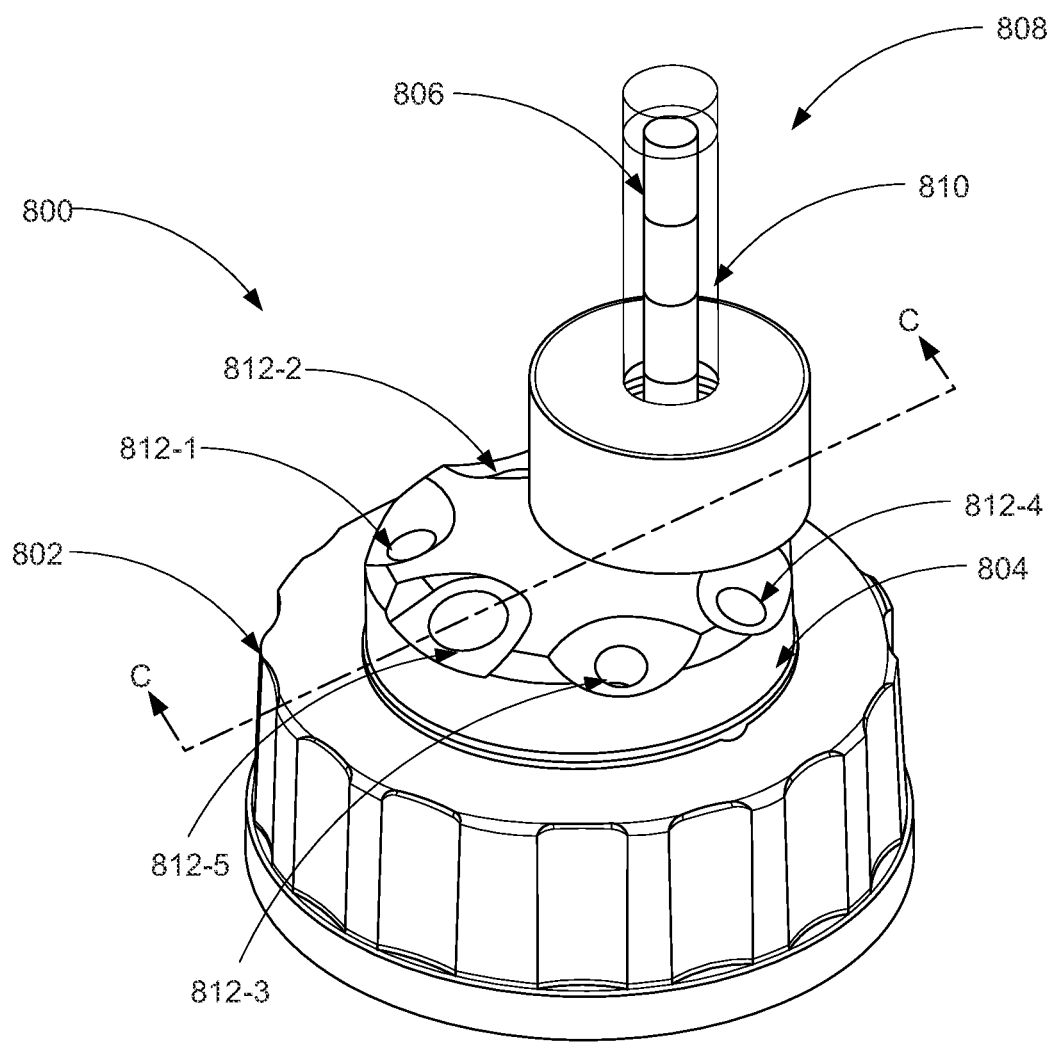
FIG. 8 illustrates an isometric view of another example of an instrument closure including an instrument closure retainer and a sensor retainer, in accordance with an example of the present disclosure.
Figure 9:
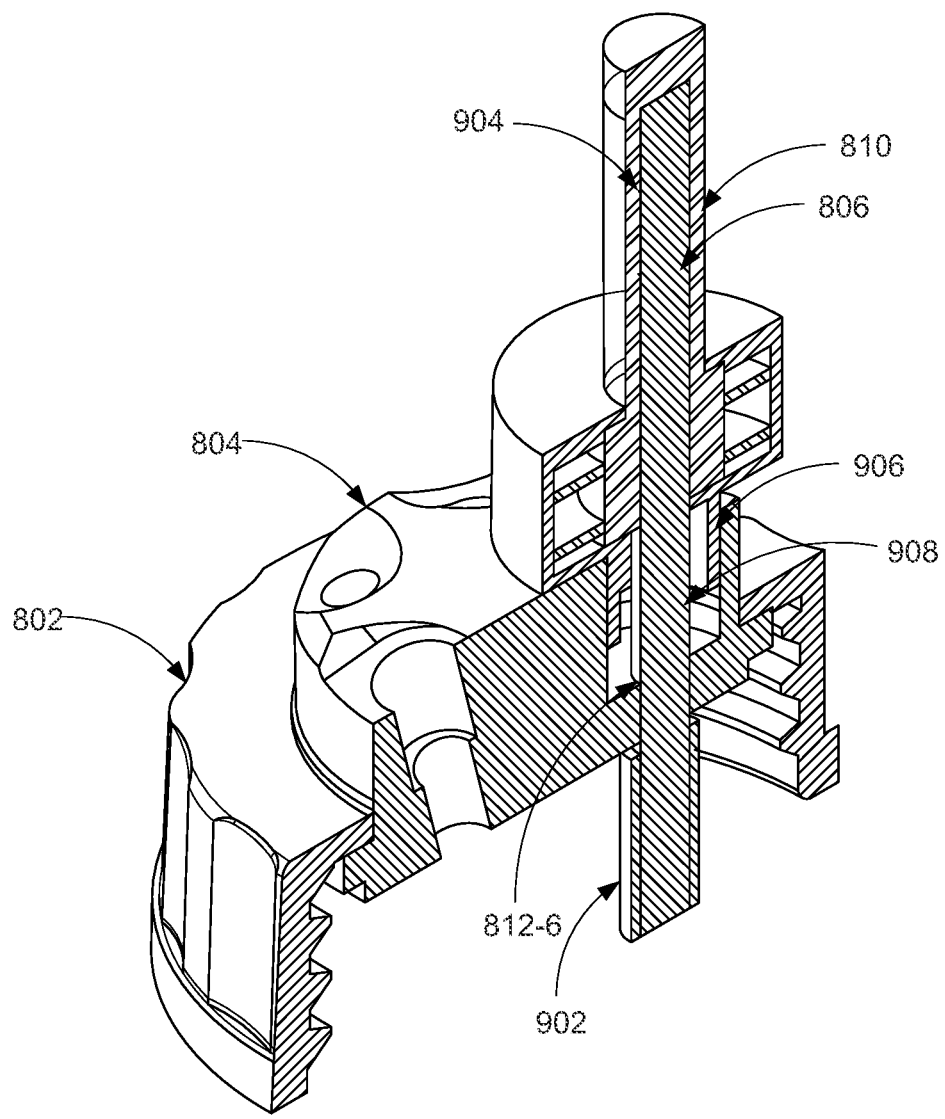
FIG. 9 illustrates a sectional view of the instrument closure of FIG. 8 taken generally along section C-C of FIG. 8, in accordance with an example of the present disclosure.
Figure 10:
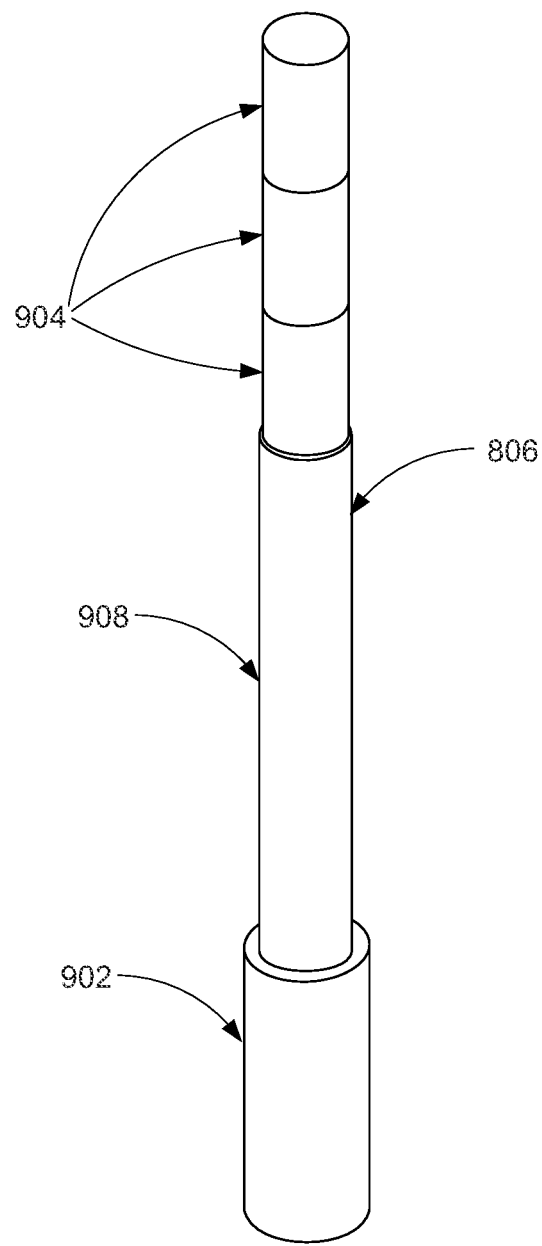
FIG. 10 illustrates an isometric view of a floater of another example of a sensor usable with the sensor retainer of FIG. 8, in accordance with an example of the present disclosure.

FIG. 8 illustrates an isometric view of another example of an instrument closure 800 including an instrument closure retainer 802 and a sensor retainer 804, in accordance with an example of the present disclosure. FIG. 9 illustrates a sectional view of the instrument closure 800 taken generally along section C-C of FIG. 8, in accordance with an example of the present disclosure. FIG. 10 illustrates an isometric view of a floater 806 of another example of a sensor 808 usable with the sensor retainer 804, in accordance with an example of the present disclosure.

Referring to FIGS. 8-10, and particularly FIG. 8, compared to the instrument closure 100 of FIG. 1, the instrument closure 800 may include a sensor mount 810 disposed on top of the sensor retainer 804. The sensor mount 810 may provide for fluid level sensing to prevent, for example, a container (e.g., waste canister, not shown) fill level exceeding a specified level for convenient emptying of the container.

The sensor retainer 804 may include a plurality of apertures 812 (e.g., apertures 812-1, 812-2, 812-3, 812-4, 812-5, and 812-6 in the example of FIGS. 8 and 9). Apertures 812-1, 812-2, 812-3, and 812-4 may be provided in a symmetric configuration for alignment with complementary inserts (not shown). Aperture 812-5 may be shaped similar to apertures 812-1, 812-2, 812-3, and 812-4, but include a larger diameter opening. Further, aperture 812-6 may include internal threads as shown for engagement with external threads of a complementary insert 906. The complementary inserts associated with 812-1, 812-2, 812-3, 812-4, and 812-5 may provide for transfer or removal of fluid or other material, respectively, into or from the container (not shown) onto which the instrument closure 800 is connected. Further, aperture 812-6 may be provided for engagement with external threads of the complementary insert 906, which may be operationally connected to the sensor mount 810.

As shown in FIG. 9, the floater 806 may slide in a vertical direction relative to the sensor retainer 804. For example, the sensor retainer 804 may include the aperture 812-6 to facilitate vertical sliding of the floater 806 in the orientation of FIG. 9. In this regard, the floater 806 may include a floating element 902 and level indicators 904 connected to the floating element 902 via tube 908. In the orientation of FIGS. 9 and 10, the floating element 902 may cause the floater 806 to rise upwards as fluid level increases, or drop downwards as fluid level decreases. The level indicators 904 may include different color ranges (e.g., green, yellow, and red) that indicate a level range of fluid in the container. For example, green may indicate a lower than specified level of fluid in the container, yellow may indicate a specified level of fluid in the container, and red may indicate a higher than specified level of fluid in the container. In this regard, assuming that red indicates a fill level exceeding the specified level for convenient emptying of the container, the container may not be filled further once the level indicator reaches yellow. Other colors, numerical values, and indicia generally may be utilized with respect to the level indicators 904.

With continued reference to FIGS. 8-10, and particularly FIGS. 8 and 10, the level indicators 904 may include equal indicia (e.g., color) ranges as shown. Alternatively, the level indicators 904 may include unequal indicia (e.g., color) ranges (not shown). For example, the unequal indicia ranges may be used to control an amount of fluid that may be filled in a container. For example, the unequal indicia ranges may include a first range that indicates no (or lower than specified level) fluid in the container, a second range that indicates a specified level of fluid in the container, and a third range that indicates a higher than specified level of fluid in the container. The equal or unequal indicia ranges may be utilized for automatic (e.g., without human intervention) shutoff of further fluid placement into the container.

In another example, not shown in the figures, the sensor mount 810 is not positioned at the top of the sensor retainer 804, as shown in FIGS. 8-10. For example, the sensor mount 810 may be located on the bottom or side of the sensor retainer 804. Moreover, in an example the sensor retainer 804 and the sensor mount, such as sensor mount 810, may be two separate parts that are connected to one another or may be a single part.

Figure 11:
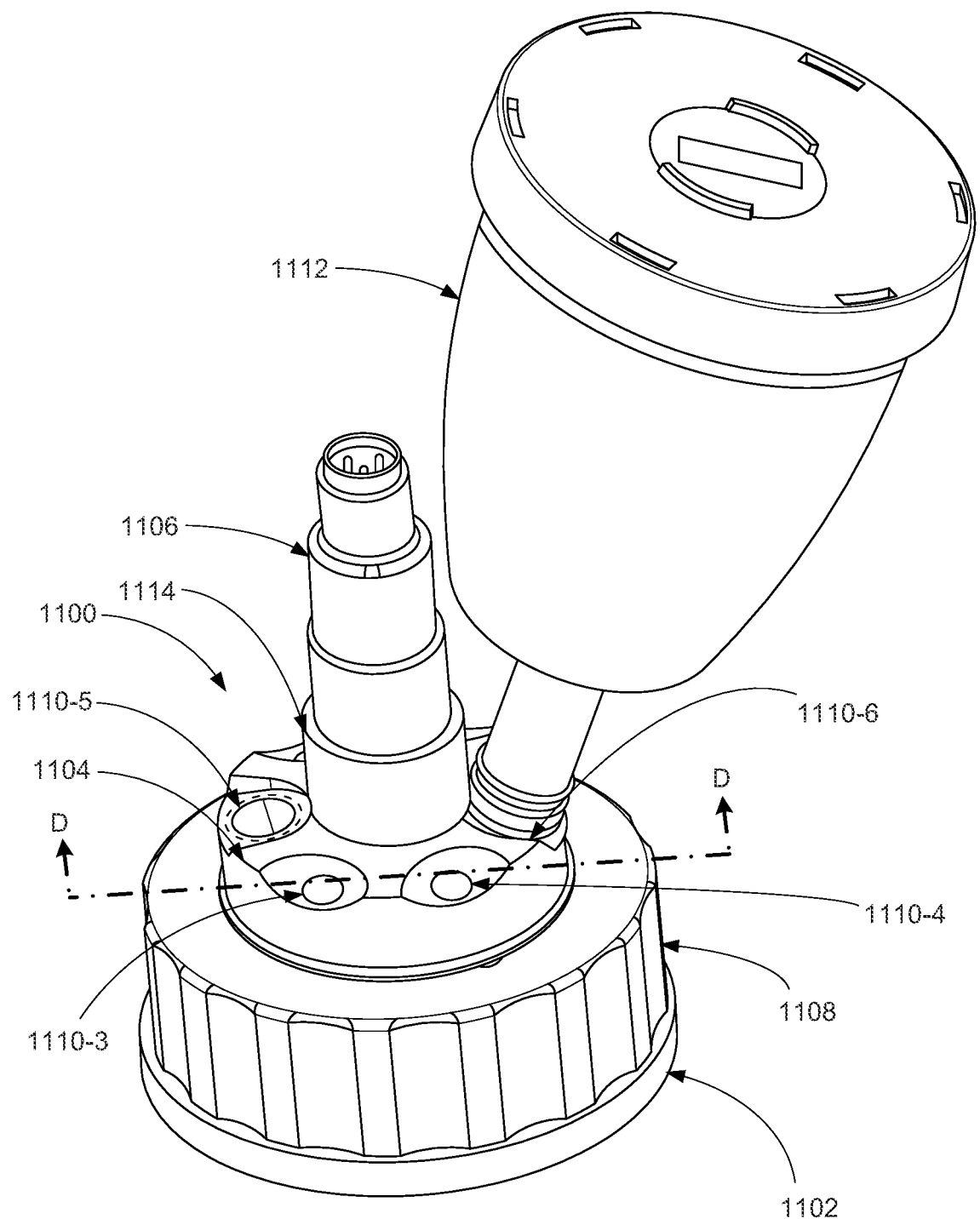
FIG. 11 illustrates an isometric view of another example of an instrument closure including an instrument closure retainer, a sensor retainer, and a sensor retained in the sensor retainer, in accordance with an example of the present disclosure.
Figure 12A:
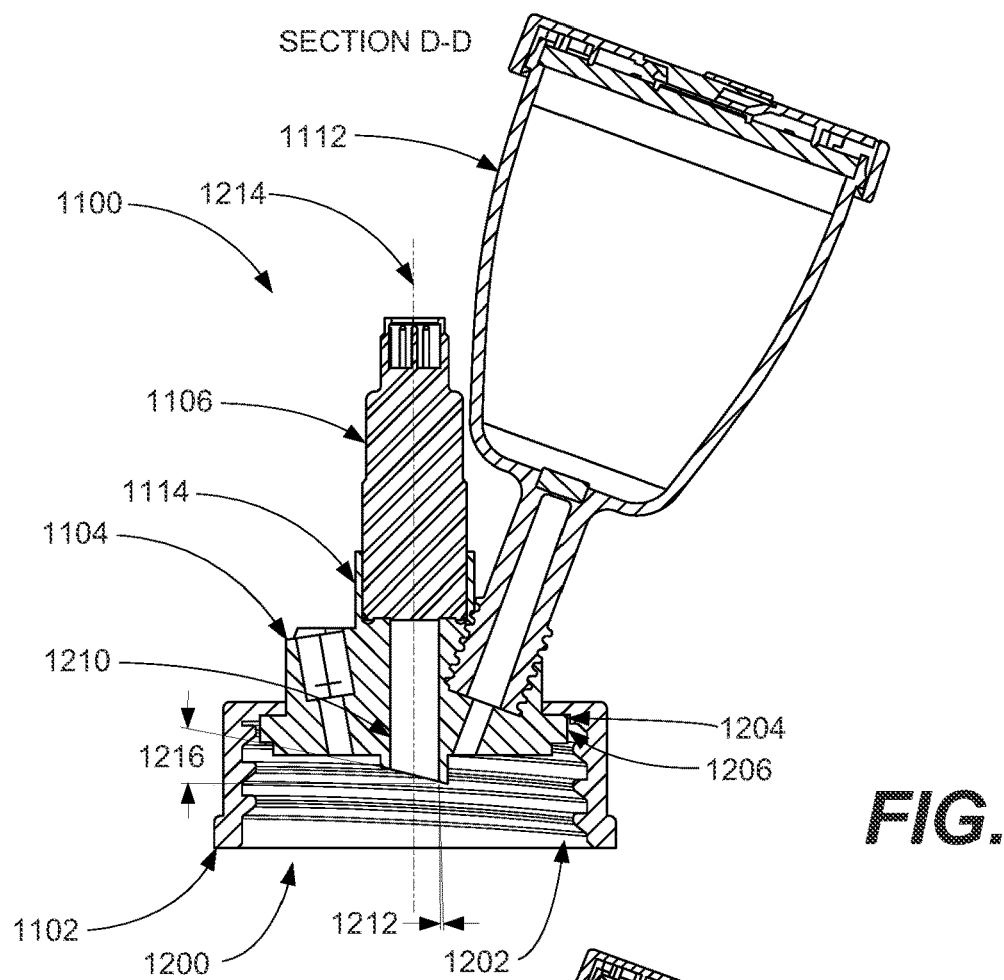
FIG. 12A illustrates a sectional view of the instrument closure of FIG. 11 taken generally along section D-D of FIG. 11, illustrating the instrument closure retainer, the sensor retainer, and the sensor retained in the sensor retainer, in accordance with an example of the present disclosure.
Figure 12B:
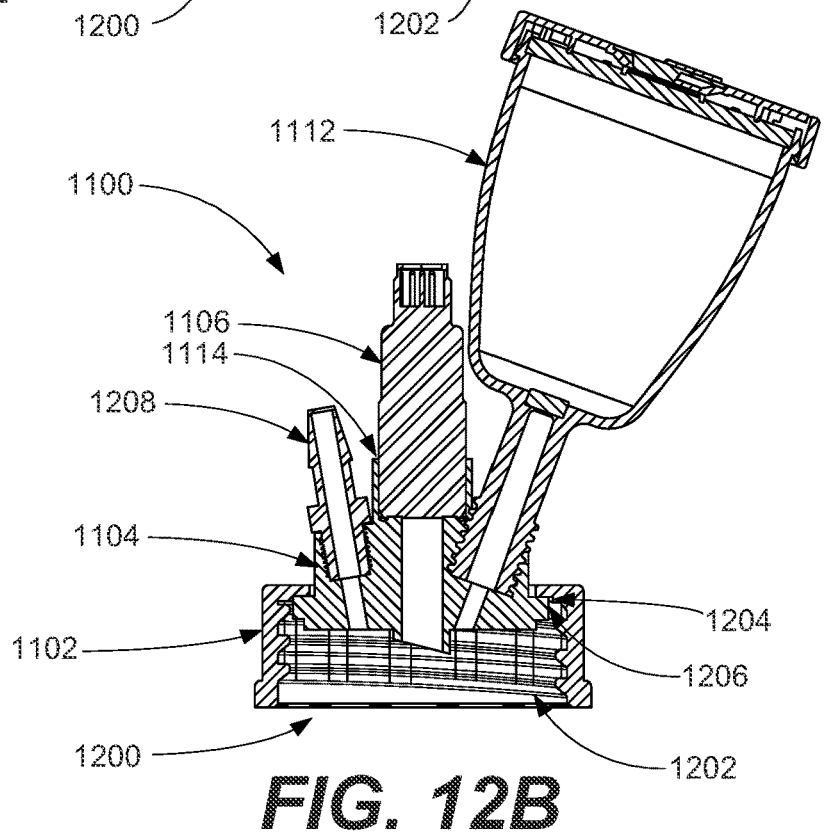
FIG. 12B illustrates a sectional view similar to FIG. 12A, illustrating the instrument closure retainer, the sensor retainer, the sensor retained in the sensor retainer, and an insert, in accordance with an example of the present disclosure.

FIG. 11 illustrates an isometric view of another example of an instrument closure 1100 including an instrument closure retainer 1102, a sensor retainer 1104, and a sensor 1106 retained in the sensor retainer 1104, in accordance with an example of the present disclosure. FIG. 12A illustrates a sectional view of the instrument closure 1100 of FIG. 11 taken generally along section D-D of FIG. 11, illustrating the instrument closure retainer 1102, the sensor retainer 1104, and the sensor 1106 retained in the sensor retainer 1104, in accordance with an example of the present disclosure. FIG. 12B illustrates a sectional view similar to FIG. 12A, illustrating the instrument closure retainer 1102, the sensor retainer 1104, the sensor 1106 retained in the sensor retainer 1104, and an insert 1112, in accordance with an example of the present disclosure. FIGS. 13A and 13B respectively illustrate an isometric top view and a sectional (section E-E) view of the sensor retainer 1104 of FIG. 11, in accordance with an example of the present disclosure.

The sensor 1106 (and the sensor 210) may include a Ptfe or another type of coating, for example, for resistance to a chemical in the container.

Referring to FIGS. 11-13B, the instrument closure 1100 may include the instrument closure retainer 1102 and the sensor retainer 1104. The instrument closure retainer 1102 may retain the instrument closure 1100 onto a container (not shown), such as a bottle. The instrument closure retainer 1102 may include an outer surface 1108 including a knurled configuration to facilitate grasping and rotation of the instrument closure retainer 1102. As shown in FIGS. 12A and 12B, an inner surface 1200 of the instrument closure retainer 1102 may include threads 1202 for threaded engagement with external threads (not shown) of the container (not shown). As shown in FIG. 12B, the instrument closure retainer 1102 may further include a notch 1204 engageable with a surface of complementary protrusion 1206 of the sensor retainer 1104 to retain the sensor retainer 1104 within the instrument closure retainer 1102.

Referring to FIGS. 11 and 13A, the sensor retainer 1104 may include a plurality of apertures 1110 (e.g., apertures 1110-1, 1110-2, 1110-3, 1110-4, 1110-5, and 1110-6). Apertures 1110-1, 1110-2, 1110-3, and 1110-4 may be provided in a symmetric configuration for alignment with complementary inserts (not shown). Aperture 1110-5 may be shaped similar to apertures 1110-1, 1110-2, 1110-3, and 1110-4, but include a larger diameter opening. Further, aperture 1110-6 may include internal threads as shown for engagement with external threads of a complementary insert 1112. The complementary insert 1112 may be in the form of a filter, such as a charcoal filter. The complementary inserts may provide for transfer or removal of fluid or other material, respectively, into or from the container (not shown) onto which the instrument closure 1100 is connected.

Referring to FIGS. 11-13B, the sensor retainer 1104 may include a sensor mount 1114 including a cylindrical configuration to removably retain the sensor 1106. In the example of FIGS. 11-13B, the sensor 1106 may include an ultrasonic sensor. The sensor 1106 may be retained by a friction fit between an outer surface of the sensor 1106 and an inner surface of the sensor mount 1114. Alternatively, the sensor 1106 may include an external threaded surface for complementary engagement with an internal threaded surface of the sensor mount 1114.

With continued reference to FIGS. 11-13B, compared to the instrument closure 100 of FIGS. 1 and 2 that includes the sensor mount 208 that points downwards in the orientation of FIG. 2, sensor mount 1114 instead points upwards in the orientation of FIGS. 11-13B. In this regard, the sensor mount 1114 maintains the sensor 1106 in an orientation that is clear from contact with any fluid in a container (not shown) onto which the instrument closure 1100 is mounted. For example, as shown at location 1300 of FIG. 13B, any fluid that may contact or be in proximity to this location may remain clear from the sensor 1106.

With respect to FIG. 12A, the sensor mount 1114 may position the sensor 1106 at a predetermined distance from fluid or another material in a container onto which the instrument closure 1100 is mounted. In this regard, a passage 1210 may be utilized by the sensor 1106 for receiving and transmitting sensing signals to sense, for example, a level and/or content, of fluid of another material in the container. The passage 1210 may be denoted a sound pipe for receiving and transmitting the signals. In the example of FIG. 12A, the passage 1210 may be tapered outwards from top to bottom in the orientation of FIG. 12A to include a taper angle 1212, for example, of approximately 2° relative to a central axis 1214 of the instrument closure 1100. However, other angles may be utilized for the passage 1210 depending, for example, on the technical specifications of the sensor 1106 and/or the fluid that is to be detected within the container. Similarly, a bottom of the passage 1210 may be angled at 1216 depending, for example, on the technical specifications of the sensor 1106 and/or the fluid or material that is to be detected within the container.

With respect to FIG. 12B, an insert 1208 is shown as being inserted into aperture 1110-5. The insert 1208 may be in the form of a connector for a tube. The insert 1208 may provide for transfer or removal of fluid or other material, respectively, into or from the container (not shown) onto which the instrument closure 1100 is connected.

FIGS. 14A, 14B, and 14C respectively illustrate an isometric top view, a sectional (section F-F) view, and an isometric bottom view of another example of sensor retainer 1400, in accordance with an example of the present disclosure.

With respect to FIGS. 14A-14C, the sensor retainer 1400 may include an aperture 1402 (similar to aperture 1110-6) that includes a smooth internal profile. Comparably, for FIGS. 11-13B, the aperture 1110-6 of the sensor retainer 1104 may include the internal threads as shown for engagement with external threads of the complementary insert 1112. For the sensor retainer 1400, the smooth internal profile of the aperture 1402 may be utilized for inserts that include a friction fit within the aperture, as opposed to a threaded engagement.

Figure 15:
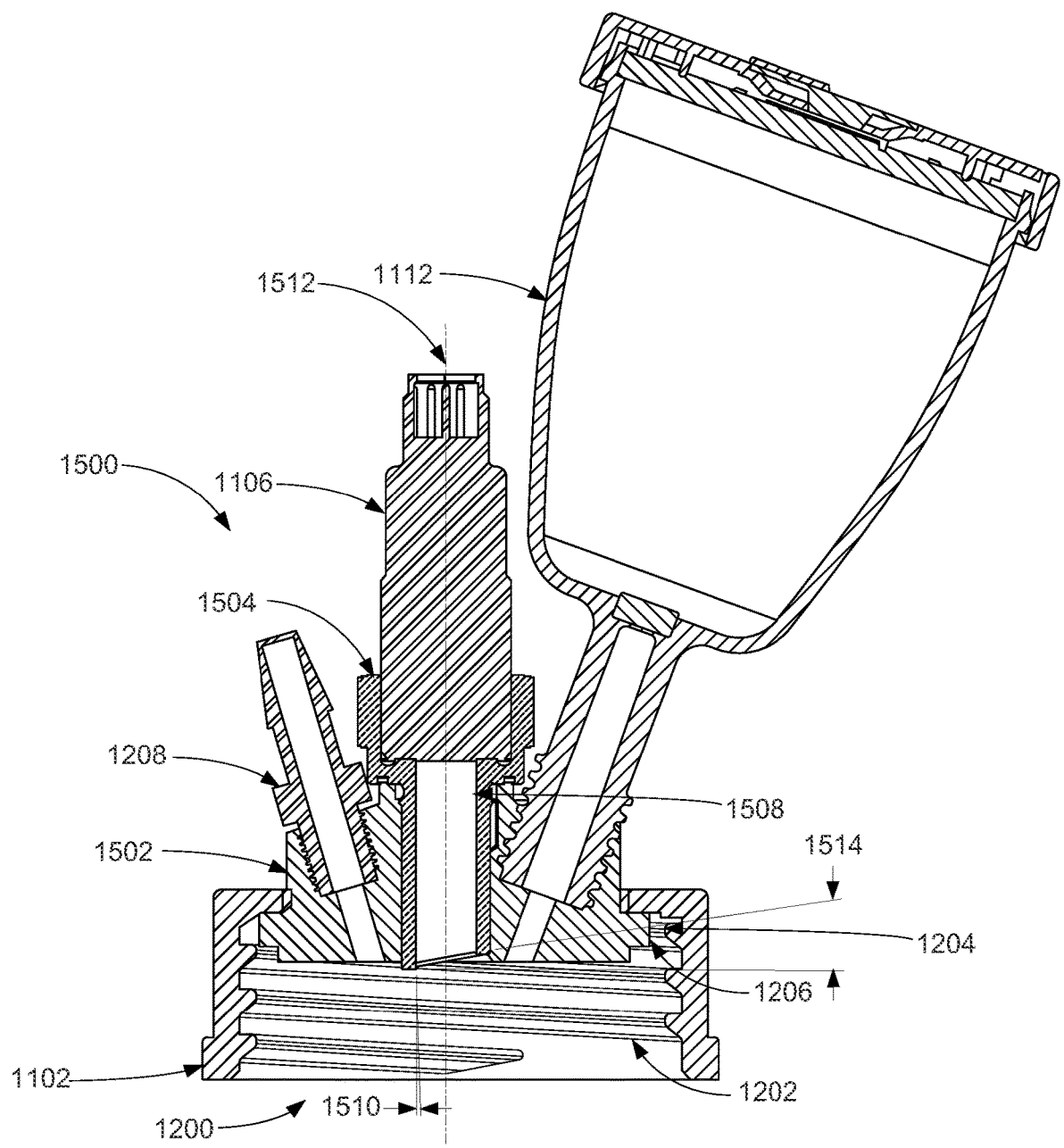
FIG. 15 illustrates a sectional view similar to FIG. 12B, illustrating the instrument closure retainer, another example of a sensor retainer, the sensor retained in the sensor retainer, and an insert, in accordance with an example of the present disclosure.

FIG. 15 illustrates a sectional view similar to FIG. 12B, illustrating the instrument closure retainer, another example of a sensor retainer, the sensor retained in the sensor retainer, and an insert, in accordance with an example of the present disclosure.

Referring to FIG. 15, compared to the instrument closure 1100 of FIGS. 11-13B, instrument closure 1500 of FIG. 15 may include another example of a sensor retainer 1502, the sensor 1106 retained in the sensor retainer 1502, and insert 1112. A sensor mount 1504 including a cylindrical configuration may removably retain the sensor 1106. Compared to the instrument closure 1100 of FIGS. 11-13B that includes the sensor mount 1114 that is integrally formed with the sensor retainer 1104, for FIG. 15, the sensor mount 1504 may be separately formed and inserted into the sensor retainer 1502 and retained in the sensor retainer 1502 by screwing, friction fit, gluing, etc. The separate formation of the sensor mount 1504 from the sensor retainer 1502 may provide a contact material between the sensor 1106 and the sensor mount 1504 that is different from a material of the sensor retainer 1502. This functionality may provide a different engagement interface between the sensor 1106 and the sensor mount 1504, compared to the engagement interface between the sensor 1106 and the sensor mount 1114.

As disclosed herein with respect to FIG. 12A, for the instrument closure 1500, the sensor mount 1504 may similarly include a passage 1508 that may be tapered outwards from top to bottom in the orientation of FIG. 15 to include a taper angle 1510, for example, of approximately 2° relative to a central axis 1512 of the instrument closure 1500. However, other angles may be utilized for the passage 1508 depending, for example, on the technical specifications of the sensor 1106 and/or the fluid that is to be detected within the container. Similarly, a bottom of the passage 1508 may be angled at 1514 depending, for example, on the technical specifications of the sensor 1106 and/or the fluid or material that is to be detected within the container.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An instrument closure comprising:
    an instrument closure retainer to retain the instrument closure onto a container; and
    a sensor retainer including
        a plurality of apertures for transfer or removal of material, respectively, into or from the container; and
        a sensor mount to retain a sensor, wherein the sensor mount is configured to extend along and be coaxial with a central longitudinal axis of the sensor retainer beyond the instrument closure retainer into the container or extend beyond the instrument closure retainer away from the container, and wherein the sensor mount is substantially hollow to enable electrical connection to the sensor from an open end of the sensor mount that is open to environment.

2. The instrument closure according to claim 1,
wherein the sensor retainer includes a first face that is positioned towards the container and a second opposite face that is positioned away from the container when the instrument closure is retained onto the container, and wherein the sensor mount is positioned on the first face.

3. The instrument closure according to claim 1, wherein the sensor mount includes a cylindrical cross-section to retain a complementary shaped sensor substantially within the sensor mount.

4. The instrument closure according to claim 1, wherein the sensor mount includes at least two sensor mount structures that form a partial cylindrical cross-section to retain a cylindrical sensor substantially within the sensor mount.

5. The instrument closure according to claim 1,
wherein the sensor retainer includes a first face that is positioned towards the container and a second opposite face that is positioned away from the container when the instrument closure is retained onto the container, and wherein the sensor mount is positioned on the second face.

6. The instrument closure according to claim 5, wherein the sensor includes a floater that is at least partially disposed thorough the sensor retainer to measure a level of fluid in the container.

7. The instrument closure according to claim 5, wherein the sensor mount is dimensioned to maintain the sensor at a predetermined distance from the container.

8. The instrument closure according to claim 1,
wherein at least one aperture of the plurality of apertures is internally threaded to retain an insert that is at least partially externally threaded.

9. The instrument closure according to claim 1, wherein the instrument closure retainer includes a knurled outer surface to facilitate gripping of the instrument closure retainer.

10. The instrument closure according to claim 1, wherein the sensor retainer is at least partially retained within the instrument closure retainer.

11. The instrument closure according to claim 1, wherein at least one aperture of the plurality of apertures is fluidically connected to a passage in the sensor retainer, and wherein the passage is transverse to the central longitudinal axis of the instrument closure.

12. The instrument closure according to claim 1, wherein the sensor mount is formed integrally with the sensor retainer.

13. The instrument closure according to claim 1, wherein the sensor mount is formed separately from the sensor retainer.

14. An instrument closure comprising:
an instrument closure retainer to retain the instrument closure onto a container;
a sensor retainer including a face that is positioned away from the container when the instrument closure is retained onto the container; and
a sensor mount to retain a sensor,
wherein the sensor mount is positioned on the face,
wherein the sensor mount includes a cylindrical cross-section including a central longitudinal axis to retain the sensor including a complementary shape substantially within the sensor mount, and
wherein the central longitudinal axis of the sensor mount is coaxial with a central longitudinal axis of the sensor retainer.

15. The instrument closure according to claim 14, wherein the sensor mount is dimensioned to maintain the sensor at a predetermined distance from the container.

16. The instrument closure according to claim 14, wherein the sensor retainer is at least partially retained within the instrument closure retainer.

17. An instrument closure comprising:
an instrument closure retainer to retain the instrument closure onto a container; and
a sensor retainer that is at least partially retained within the instrument closure retainer,
wherein the sensor retainer retains a sensor at a predetermined distance from the container when the instrument closure is retained onto the container,
wherein the sensor retainer further includes a sensor mount that is attached to or formed with the sensor retainer and configured to protrude from the sensor retainer to retain the sensor, and
wherein the sensor mount includes at least two semi-circular sensor mount structures that are oppositely disposed, include a gap therebetween along a central longitudinal axis of the sensor retainer, and form a partial cylindrical cross-section to retain the sensor that includes a cylindrical configuration substantially within the sensor mount.

18. The instrument closure according to claim 17,
wherein the sensor retainer includes a first face that is positioned towards the container and a second opposite face that is positioned away from the container when the instrument closure is retained onto the container, and
wherein the sensor mount is positioned on the second face.

19. The instrument closure according to claim 17, further comprising:
a tapered passage formed within the sensor retainer to transmit signals emitted from the sensor towards fluid in the container and receive the signals reflected by a fluid surface of the fluid in the container,
wherein the tapered passage includes a substantially constant taper from the sensor towards the fluid in the container.

20. The instrument closure according to claim 17, wherein the sensor includes an ultrasonic sensor.

* * * * *